United States Patent
Kudermann et al.

(10) Patent No.: US 11,022,185 B2
(45) Date of Patent: Jun. 1, 2021

(54) PRESSURE CONTROL VALVE

(71) Applicant: ZF Friedrichshafen AG, Friedrichshafen (DE)

(72) Inventors: Karsten Kudermann, Constance (DE); Rainer Novak, Bregenz (AT); Tobias Pfleger, Markdorf (DE); Markus Moosmann, Grünkraut (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 57 days.

(21) Appl. No.: 16/429,762

(22) Filed: Jun. 3, 2019

(65) Prior Publication Data

US 2019/0368553 A1   Dec. 5, 2019

(30) Foreign Application Priority Data

Jun. 4, 2018  (DE) .................... 10 2018 208 755.5

(51) Int. Cl.

| | |
|---|---|
| *F16D 25/10* | (2006.01) |
| *F15B 13/02* | (2006.01) |
| *F16K 17/04* | (2006.01) |
| *F16D 25/08* | (2006.01) |

(Continued)

(52) U.S. Cl.
CPC ............ *F16D 25/10* (2013.01); *F15B 13/026* (2013.01); *F16D 25/083* (2013.01); *F16K 17/044* (2013.01); *F15B 2211/40553* (2013.01); *F16D 2121/04* (2013.01); *F16D 2500/1027* (2013.01); *F16K 3/0209* (2013.01); *F16K 3/0254* (2013.01)

(58) Field of Classification Search
CPC .................. F16D 25/10; F16D 25/083; F16D 2500/1027; F16D 2121/04; F16D 25/14; F15B 13/026; F15B 2211/40553; F15B 13/0402; G05D 16/187; G05D 16/101; F16H 61/0021; F16H 61/30; F16H 61/0276; F16H 2061/004
See application file for complete search history.

(56) References Cited

U.S. PATENT DOCUMENTS

| | | | |
|---|---|---|---|
| 4,857,034 A | * | 8/1989 | Kouno .................. B60W 30/18 474/28 |
| 8,806,863 B2 | | 8/2014 | Gierer et al. |

(Continued)

FOREIGN PATENT DOCUMENTS

DE   102009002105 A1   10/2010

*Primary Examiner* — David J Hlavka
(74) *Attorney, Agent, or Firm* — Dority & Manning, P.A.

(57) ABSTRACT

A pressure control valve (1) includes a pressure port (P), a consumer port (A), a tank port (T), and a piston (K) which is displaceable counter to the force of a first spring (F1) and a second spring (F2). The springs (F1, F2) and area ratios of the pressure control valve (1) are designed such that the pressure port (P), in the non-pressurized condition, is connected to the consumer port (A) via an opening cross-section of the pressure control valve (1). An opening cross-section between the pressure port (P) and the consumer port (A) decreases depending on the pressure at the consumer port (A), and, upon attainment of a limiting pressure at the consumer port (A), the consumer port (A) is connected to the tank port (T). A related hydraulic system (HY) and a related motor vehicle transmission (G) are also provided.

15 Claims, 6 Drawing Sheets

(51) Int. Cl.
  *F16K 3/02*    (2006.01)
  *F16D 121/04*  (2012.01)

(56) References Cited

U.S. PATENT DOCUMENTS

2001/0015229 A1* 8/2001 Kremer .................. F16D 48/02
                                                137/625.66
2004/0089355 A1* 5/2004 Nirasawa ............. G05D 16/101
                                                137/625.69
2011/0146815 A1* 6/2011 Eriksson ................ F15B 11/05
                                                    137/540

* cited by examiner

PRESSURE CONTROL VALVE

FIELD OF THE INVENTION

The invention relates generally to a pressure control valve, preferably for use in a hydraulic system. Moreover, the invention relates generally to such a hydraulic system, and to a motor vehicle transmission with such a hydraulic system.

BACKGROUND

Patent application DE 10 2009 002 105 A1, which belongs to the applicant, describes a hydraulic transmission control unit that includes a pilot-controlled pressure control valve which is configured for adjusting the force transmission of a clutch. A separate pre-filling valve is associated with the pressure control valve in order to prevent the clutch actuation pressure from dropping below a pre-filling pressure.

SUMMARY OF THE INVENTION

Example aspects of the invention provide a pressure control valve which can ensure a defined pressure level of the hydraulic consumer even without an additional valve.

According to example aspects of the invention, a pressure control valve is provided, which includes a pressure port, a consumer port, and a tank port. A piston, which is displaceable against the force of a first spring, is guided in at least one working chamber of the pressure control valve.

According to example aspects of the invention, the pressure control valve includes a second spring which acts on the piston counter the force of the first spring. The spring force of the first and the second springs as well as the area ratios of the pressure control valve are designed in such a way that the following conditions of the pressure control valve set in:

In the non-pressurized condition of the pressure port, i.e., in a condition in which no pressure greater than the ambient pressure is present at the pressure port, the consumer port is connected to the pressure port via an opening cross-section of the pressure control valve. The tank port is hydraulically disconnected from the pressure port and from the consumer port. This condition is referred to as the basic condition.

If the pressure at the consumer port reaches or exceeds a first limiting value, the spring preload is overcome and the piston moves. In so doing, the opening cross-section between the pressure port and the consumer port decreases as compared to the basic condition until an equilibrium of forces sets in between the spring forces, the pressure force induced by the pressure at the pressure port, and the flow force. The tank port is still disconnected from the pressure port and from the consumer port. This condition is referred to as the working condition.

If the pressure at the consumer port reaches or exceeds a second limiting value which is greater than the first limiting value, the consumer port is connected to the tank port due to the prevailing relative forces on the piston, wherein the pressure port is hydraulically disconnected from the consumer port and from the tank port. This condition is referred to as the reduction condition. If the reduction condition is reached, the pressure at the consumer port is lowered. As a result, the piston is moved back by the spring forces until the valve assumes the working condition again.

In the working condition of the pressure control valve, the pressure at the consumer port therefore independently assumes a defined pressure level without an additional valve being utilized for this purpose.

Preferably, an additional external force may act on the piston. This external force acts on the piston counter to the force of the first spring and may be applied, for example, with the aid of a solenoid or hydraulically. As a result, the equilibrium of forces on the piston of the pressure control valve in the working condition may be changed in a targeted manner, and so the pressure at the consumer port may be controlled by way of an open-loop system.

Preferably, the piston includes a first control surface and a second control surface. The pressure acting at the consumer port acts on the first control surface and on the second control surface in this case. The two control surfaces are positioned opposite one another. The pressure acting on the first control surface acts counter to the force of the second spring.

According to a first possible embodiment, the first control surface is larger than the second control surface. According to a second possible embodiment, an additional differential control surface is provided, on which the pressure present at the consumer port acts. The hydraulic connection between the differential control surface and the consumer port takes place via at least one bore hole within the piston. When the valve includes the differential control surface, the first control surface may have the same cross-sectional area as the second control surface. Both embodiments have advantages. In a design according to the first embodiment, bore holes in the piston are not necessary. In a design according to the second embodiment, only two diameters of the piston—apart from the bore holes and the differential control surface—are to be produced, and so the guidance and sealing of the piston are facilitated.

Preferably, a pressure pocket is associated, in each case, with the pressure port, the consumer port, and the tank port of the pressure control valve. The three ports are hydraulically connected to or disconnected from the at least one working chamber via the pressure pockets, depending on the position of the piston. The pressure pocket associated with the consumer port is preferably located between the pressure pocket associated with the pressure port and the pressure pocket associated with the tank port. As a result, the configuration of the pressure control valve is simplified.

The pressure control valve may be an integral part of a hydraulic system, wherein a hydraulic actuator of the hydraulic system is connected to the consumer port of the pressure control valve. The pressure at the consumer port that sets in in the working condition of the pressure control valve corresponds to a pre-filling pressure of the hydraulic actuator. As a result, a draining of the hydraulic actuator may be avoided.

A shut-off valve may be connected to the pump port of the pressure control valve in order to prevent hydraulic fluid from draining from the consumer port via the pump port in the direction of a pressure supply of the hydraulic system in the basic condition of the pressure control valve.

The hydraulic system may be an integral part of a motor vehicle transmission. The hydraulic actuator of the hydraulic system may be provided for actuating at least one shift element of the transmission. With the aid of the shift element, a torque-transmitting connection between two elements of the motor vehicle transmission may be established or disconnected. For this purpose, the shift element may be formed, for example, by an engageable clutch or by an engageable brake. The shift element may be provided, for example, for establishing a force-fit connection in a gearshift section, which is provided for establishing different transmission ratios between an input shaft and an output shaft of the motor vehicle transmission. Alternatively, the shift element may be an integral part of a launch clutch of the motor vehicle transmission, for example, a dual clutch device. The shift element may be, in particular, a multi-disk clutch.

BRIEF DESCRIPTION OF THE DRAWINGS

Exemplary embodiments of the invention are described in detail in the following with reference to the attached figures. Wherein.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
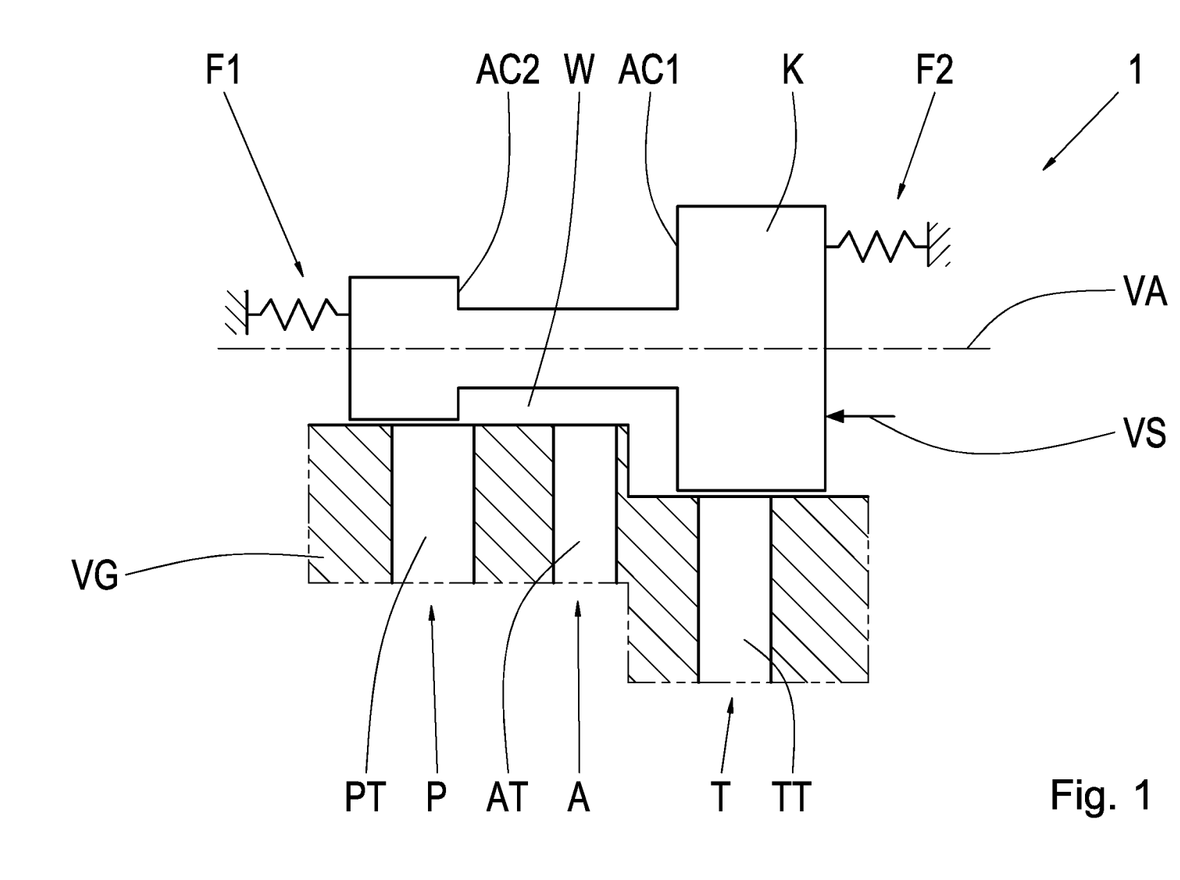
FIGS. 1, 2 and 3 each show a schematic of a pressure control valve according to the invention, according to various embodiments.

FIG. 1 shows a schematic of a pressure control valve 1 according to the invention, according to a first embodiment. The pressure control valve 1 includes a valve housing VG, in which a pressure port P, a consumer port A, and a tank port T are provided. Located in the valve housing VG is a working chamber W, in which a piston K is displaceably guided along an axis VA. A first spring F1 and a second spring F2 act on the piston K, preloading the piston K in the direction of the axis VA. In addition, the piston K may be acted upon by an external force VS which acts on the piston K counter to the force of the first spring F1 and together with the force of the second spring F2. The external force VS may be applied onto the piston K in various ways, for example, with the aid of a solenoid or via a hydraulic pressure.

The pressure control valve 1 includes a pressure pocket PT which is hydraulically connected to the pressure port P. A pressure pocket AT is hydraulically connected to the consumer port A, and a pressure pocket TT is hydraulically connected to the tank port T. Via the pressure pockets PT, AT, TT, the ports P, A, T may be hydraulically connected to one another or hydraulically disconnected from one another depending on the position of the piston K, wherein the hydraulic connection takes place via the working chamber W. The pressure pocket AT is arranged between the pressure pocket PT and the pressure pocket TT.

The piston K includes a first control surface AC1 and a second control surface AC2 which are positioned opposite each other. Both control surfaces AC1, AC2 are hydraulically connected to the pressure pocket AT and, in fact, regardless of the position of the piston K. The first control surface AC1 has a larger cross-sectional area than the second control surface AC2. A pressure applied to the pressure pocket AT therefore results in a force on the piston K, which acts counter to the second spring F2 and/or the external force VS.

In FIG. 1, the pressure control valve 1 is in a basic condition in which no pressure greater than the ambient pressure is present at the pressure port P, and an external force VS does not act on the piston K. In this basic condition, the piston K, preloaded by the springs F1, F2, assumes a position in which the pressure port P is hydraulically connected to the consumer port A via the working chamber W. In the basic condition of the pressure control valve 1, the tank port T is disconnected from the consumer port A and from the pressure port P.

When the pressure at the pressure port P is now increased to such an extent that the preload force of the springs F1, F2 and, if applicable, the external force VS are overcome, the piston K is displaced counter to the force of the second spring F2 due to the area ratio of the control surfaces AC1, AC2 and the flow force. The opening cross-section in the working chamber W between the pressure pocket PT and the pressure pocket AT decreases. The tank port T is still hydraulically disconnected from the pressure port P and from the consumer port A. When the pressure at the pressure port P continues to increase, the opening cross-section in the working chamber W between the pressure pocket PT and the pressure pocket AT is further decreased until an equilibrium of forces sets in between the flow force, the pressure forces on the control surfaces AC1, AC2, the springs F1, F2, and, if applicable, the external force VS. Such a condition is referred to as the working condition.

When the pressure at the consumer port A reaches a limiting pressure, the piston K is further displaced counter to the force of the second spring F2 until the consumer port A is hydraulically connected to the tank port T via the working chamber W. The pressure port P is hydraulically disconnected from the consumer port A and from the tank port T. In this condition, which is referred to as the reduction condition, the pressure at the consumer port A may be decreased until the pressure control valve 1 reaches the working condition once again.

Figure 3:
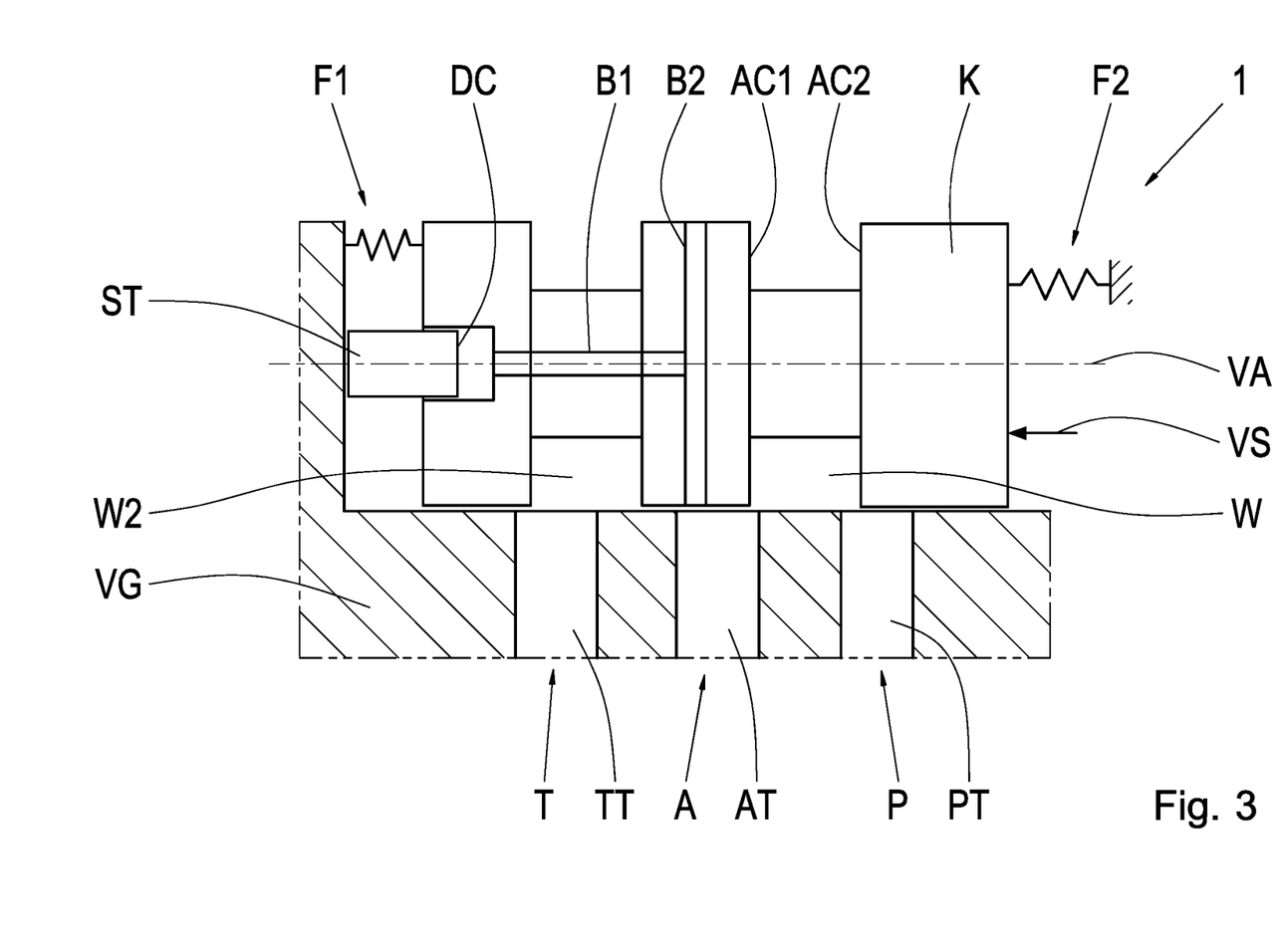

FIG. 3 shows a schematic of the pressure control valve 1 according to the invention, according to a second embodiment which essentially corresponds to the first embodiment represented in FIG. 1. The control surfaces AC1, AC2 now have the same cross-sectional area, whereby the piston K has only two different outer diameters in this case. The pressure control valve 1 now includes a pin ST, the front end of which forms a differential control surface DC. The piston K includes two bore holes B1, B2. The pressure control valve 1 now includes two working chambers W, W2 which are separated from one another. The pressure pocket AT is hydraulically connected, on the one hand, to the two control surfaces AC1, AC2 via the working chamber W and, on the other hand, to the differential control surface DC via the bore holes B1, B2. In the reduction condition of the pressure control valve 1, the pressure pocket AT is connected to the pressure pocket TT via the working chamber W2. In the basic condition and in the working condition, the pressure pocket AT is connected to the pressure pocket PT via the working chamber W.

Figure 2:
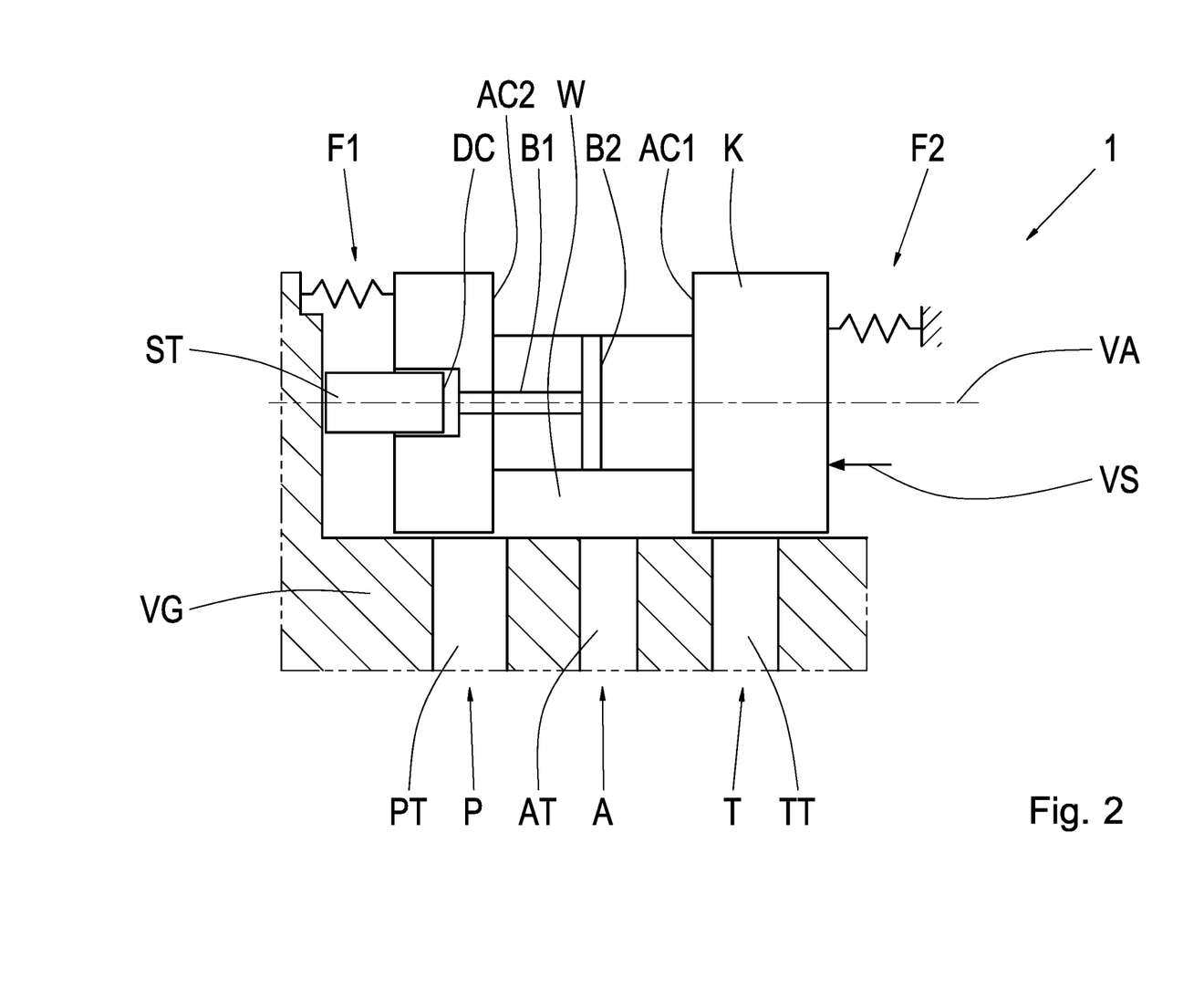

FIG. 2 shows a schematic of the pressure control valve 1 according to the invention, according to a third embodiment which essentially corresponds to the second embodiment represented in FIG. 3. The pressure pocket TT and the pressure pocket PT are now arranged at different points than in the embodiment according to FIG. 2. The pressure pocket AT is still arranged between the two pressure pockets TT, PT.

Figure 4:
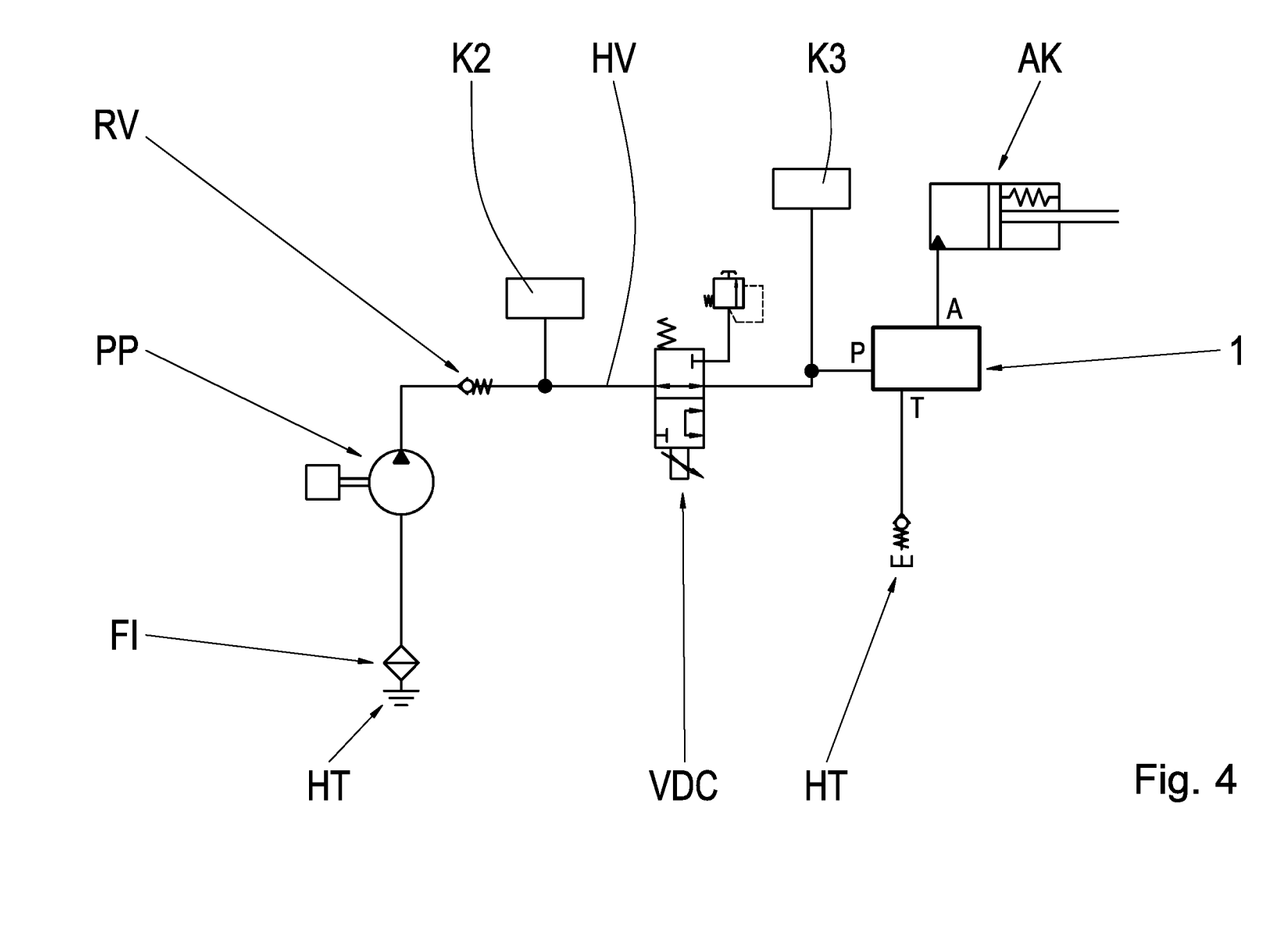
FIG. 4 shows a hydraulic system that includes the pressure control valve.

FIG. 4 shows a hydraulic system HY comprising a pump PP which suctions hydraulic fluid out of a tank HT through a filter FI and delivers the hydraulic fluid to a pressure supply line HV. A spring-loaded retention valve RV is provided in order to prevent a return flow of hydraulic fluid from the pressure supply line HV in the direction of the pump PP. The pressure supply line HV supplies various hydraulic consumers with hydraulic fluid, for example, a consumer K2, a consumer K3, and an actuator AK. A spring-loaded, electromagnetically actuatable shut-off valve VDC is arranged in the connection between the pressure supply line HV, on the one hand, and the consumer K3 and the actuator AK, on the other hand. Alternatively to the electromagnetic actuation, the shut-off valve VDC may be actuated in a pilot-controlled manner. The actuator AK is controlled, by way of an open-loop system, by a pressure control valve 1. The configuration and mode of operation of the pressure control valve 1 corresponds to the pressure control valve 1 described in the preceding FIGS. 1, 2 and 3. Each of the three embodiments according to FIGS. 1, 2 and 3 of the pressure control valve 1 may be utilized as a pressure control valve 1 in the hydraulic system HY; therefore, reference is made to the description and the reference characters of the pressure control valve 1 with respect to the following.

The shut-off valve VDC has an open position and a shut-off position. In the non-actuated condition, the shut-off valve VDC independently assumes the open position, since the shut-off valve VDC is preloaded accordingly with the aid of a spring. In the actuated condition, the shut-off valve VDC assumes the shut-off position counter to the force of the spring. In the shut-off position of the shut-off valve VDC, the consumer K3 and the pressure port P of the pressure control valve 1 are connected to a safety valve which establishes a connection to the tank HT when a limiting pressure is exceeded.

The actuator AK includes a pressure chamber which is separated from a recoil spring by a piston. The consumer port A of the pressure control valve 1 is connected to the pressure chamber of the actuator AK. The pressure port P of the pressure control valve 1 is connected to the pressure supply line HV via the shut-off valve VDC. The tank port T of the pressure control valve 1 is connected to the tank HT via a check valve.

When the shut-off valve VDC is opened, in the basic condition of the pressure control valve 1, the pressure chamber of the actuator AK is hydraulically connected to the pressure supply line HV. As a result, the pressure chamber of the actuator AK is effectively prevented from emptying in the direction of the tank HT. When the pressure in the pressure supply line HV is raised, due to the operation of the pump PP, to such an extent that the spring forces of the springs F1, F2 of the pressure control valve 1 are overcome, an equilibrium of forces between the pressure at the pressure port P, the spring forces F1, F2, the external force VS, if applicable, and the flow force in the working chamber W sets in on the piston K of the pressure control valve 1. The pressure in the pressure chamber of the actuator AK may be controlled by way of an open-loop system by varying the external force VS.

An excess-pressure safeguard of the actuator AK is made possible due to the reduction condition of the pressure control valve 1. When the pressure in the pressure chamber of the actuator AK reaches a limiting value, the pressure control valve 1 connects the pressure chamber of the actuator AK to the tank HT, wherein the pressure port P of the pressure control valve 1 is hydraulically disconnected from the tank HT and the pressure chamber of the actuator AK.

When the shut-off valve VDC is closed, in the basic condition of the pressure control valve 1, a return flow from the pressure chamber of the actuator AK toward the pump PP, counter to the blocking direction of the retention valve RV, cannot take place. As a result, a pressure drop in the pressure chamber of the actuator AK is delayed.

Figure 5:
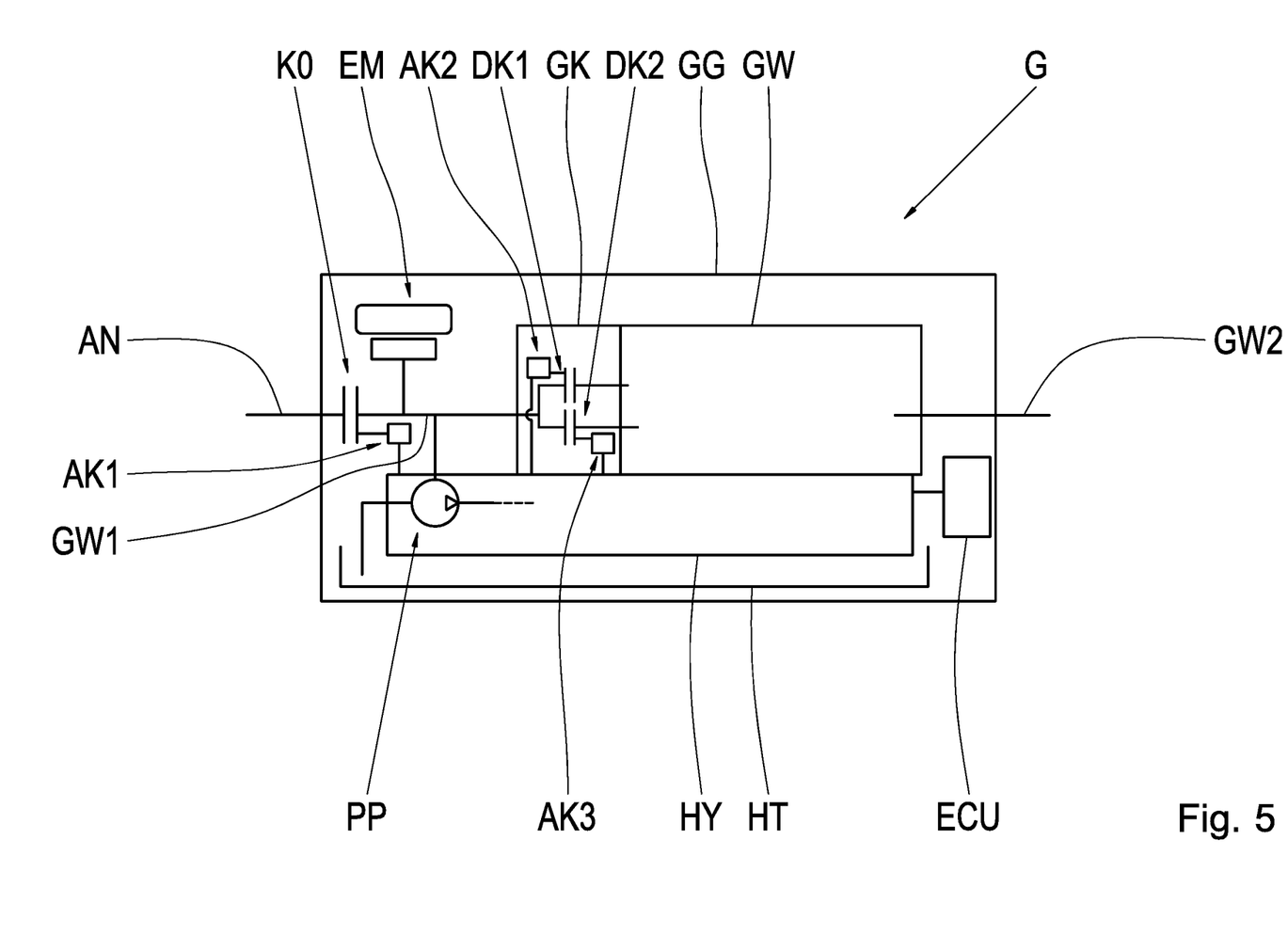
FIG. 5 and FIG. 6 each show a diagrammatic view of a motor vehicle transmission that includes the hydraulic system.

FIG. 5 shows a schematic of a motor vehicle transmission G that includes the hydraulic system HY. The motor vehicle transmission G includes a connecting shaft AN which may be connected to an input shaft GW1 via a separating clutch K0. A rotor of an electric machine EM is connected to the input shaft GW1. The input shaft drives the pump PP which is utilized for the pressure supply of the hydraulic system HY.

The motor vehicle transmission G includes a clutch section GK which accommodates a first clutch DK1 and a second clutch DK2. By engaging the first clutch DK1, the input shaft GW1 may be connected to a first sub-transmission. By engaging the second clutch DK2, the input shaft GW1 may be connected to a second sub-transmission. In a gearshift section GW, different gear ratios or steps may be implemented between the sub-transmissions and an output shaft GW2 with the aid of a gear set (not represented). The separating clutch K0 and the clutches DK1, DK2 may be designed as wet-running multi-disk clutches. For the purpose of actuation, the separating clutch K0, the first clutch DK1, and the second clutch DK2 are associated with a hydraulic actuator AK1, AK2, AK3, respectively, each of which is controlled, by way of an open-loop system, by a pressure control valve 1 of the hydraulic system HY.

An electronic control unit ECU controls the electromagnetically actuated valves of the hydraulic system HY by way of an open-loop system. The control unit ECU is connected to multiple sensors and other control units, and is configured for processing received signals and releasing control commands, depending on characteristic maps or models, to the valves and, if applicable, to further actuating elements of the hydraulic system HY.

Figure 6:
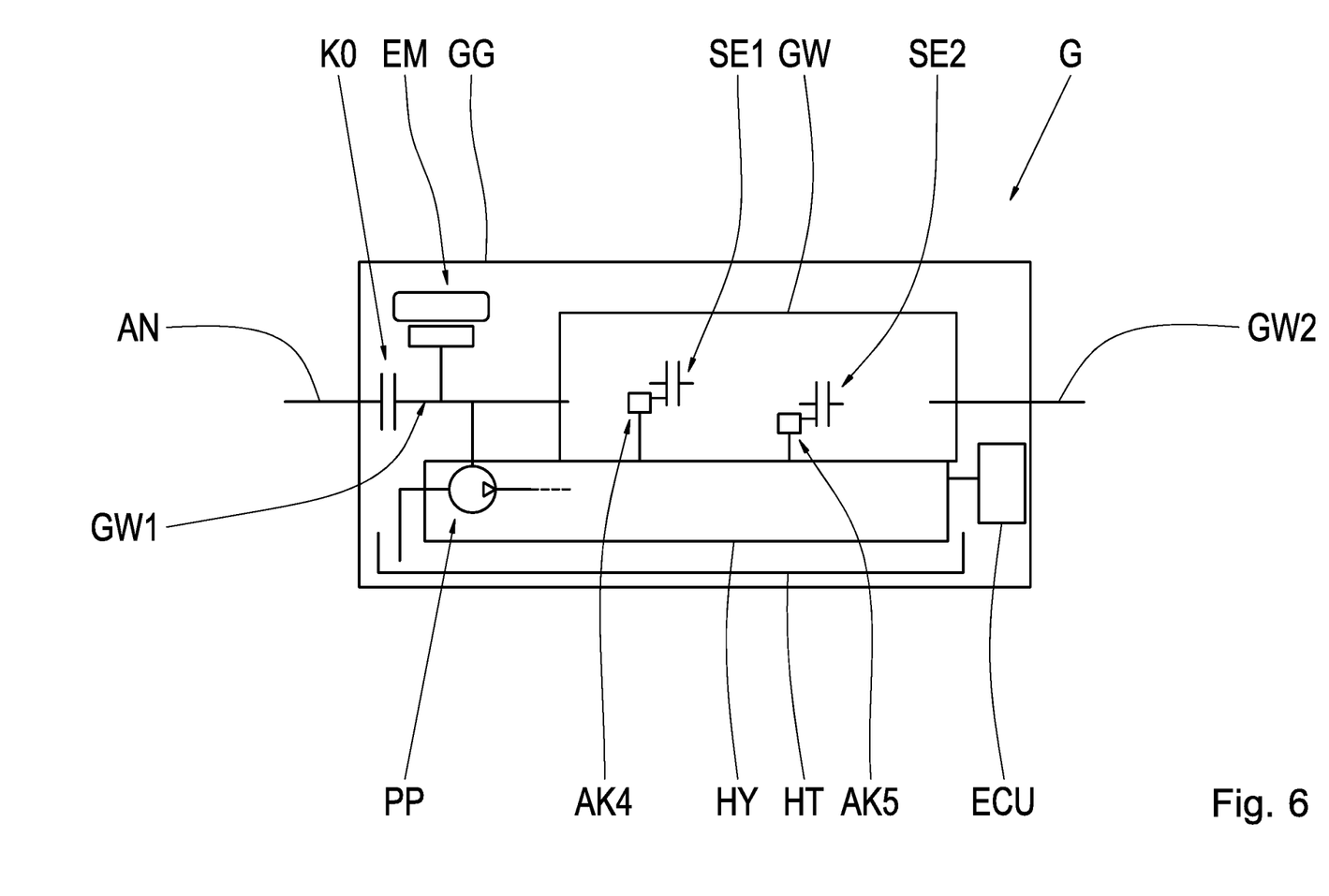

FIG. 6 shows a schematic of a further motor vehicle transmission G that includes the hydraulic system HY. In contrast to the embodiment according to FIG. 5, the motor vehicle transmission G is not designed as a dual clutch transmission in this case, but rather as an automatic transmission. For this purpose, the gearshift section GW includes planetary gear sets or spur gear stages (not represented) which cooperate with force-locking shift elements SE1, SE2 in order to implement gears. Each of the shift elements SE1, SE2 is associated with a hydraulic actuator AK4, AK5, respectively, each of which is controlled, by way of an open-loop system, by a pressure control valve 1 of the hydraulic system HY.

The embodiments of the motor vehicle transmission G according to FIGS. 5 and 6 are to be considered merely as examples. By utilizing the pressure control valve 1 according to example aspects of the invention in the hydraulic system HY, a draining of the actuators AK1, AK2, AK3, AK4, AK5 of the motor vehicle transmission G can be avoided in an easy way. In particular, no separate valves are necessary for this purpose, such as separate pre-filling valves. As a result, an actuating time of the actuators AK1, AK2, AK3, AK4, AK5 may be shortened in an easy way.

Modifications and variations can be made to the embodiments illustrated or described herein without departing from the scope and spirit of the invention as set forth in the appended claims.

REFERENCE CHARACTERS 1 pressure control valve
VG valve housing
K piston
VA axis
W, W2 working chamber
F1 first spring
F2 second spring
A consumer port
AT pressure pocket
P pressure port
PT pressure pocket
T tank port
TT pressure pocket
AC1 first control surface
AC2 second control surface
VS external force
DC differential control surface
B1, B2 bore hole
HY hydraulic system
PP pump
FI filter
HT tank
RV retention valve
HV pressure supply line
VDC shut-off valve
K2, K3 consumer
AK actuator
AK2-AK5 actuator
G motor vehicle transmission
AN connection shaft
K0 separating clutch
GG housing
EM electric machine
GW1 input shaft
GW2 output shaft
GK clutch section
DK1 first clutch
DK2 second clutch
GW gearshift section
SE1, SE2 shift element
ECU electronic control unit

The invention claimed is:

1. A pressure control valve (1), comprising:
a pressure port (P);
a consumer port (A);
a tank port (T);
a first spring (F1);
a piston (K) arranged in at least one working chamber (W, W2), the piston (K) displaceable counter to a force of the first spring (F1); and
a second spring (F2),
wherein the second spring (F2) acts on the piston (K) counter to the first spring (F1), and
wherein the first and second springs (F1, F2) and area ratios of the pressure control valve (1) are designed such that
the pressure port (P), in a non-pressurized condition, is connected to the consumer port (A) via an opening cross-section of the pressure control valve (1) between the pressure port (P) and the consumer port (A), and the tank port (T) is disconnected from the pressure port (P) and from the consumer port (A),
the opening cross-section between the pressure port (P) and the consumer port (A) decreases upon attainment of a first limiting pressure at the consumer port (A) depending on the pressure at the pressure port (P), and the tank port (T) is disconnected from the pressure port (P) and from the consumer port (A), and
upon attainment of a second limiting pressure at the consumer port (A), the consumer port (A) is connected to the tank port (T), and the pressure port (P) is disconnected from the consumer port (A) and from the tank port (T).

2. The pressure control valve (1) of claim 1, wherein the piston (K) is configured to be acted upon by an external force (VS) that is counter to the first spring (F1).

3. The pressure control valve (1) of claim 2, wherein the external force (VS) is applied onto the piston (K) with a solenoid.

4. The pressure control valve (1) of claim 2, wherein the external force (VS) is applied onto the piston (K) hydraulically.

5. The pressure control valve (1) of claim 1, wherein the piston (K) comprises a first control surface (AC1) and a second control surface (AC2) that face opposite each other and are subjectable to the pressure acting at the consumer port (A), wherein the pressure acting on the first control surface (AC1) is counter to the force of the second spring (F2).

6. The pressure control valve (1) of claim 5, wherein the first control surface (AC1) is larger than the second control surface (AC2).

7. The pressure control valve (1) of claim 1, wherein the piston (K) comprises at least one bore hole (B1, B2), the consumer port (A) connected to a differential control surface (DC) via the at least one bore hole (B1, B2).

8. The pressure control valve (1) of claim 7, wherein the piston (K) comprises a first control surface (AC1) and a second control surface (AC2) that face opposite each other and are subjectable to the pressure acting at the consumer port (A), wherein the pressure acting on the first control surface (AC1) is counter to the force of the second spring (F2), and the first control surface (AC1) and the second control surface (AC2) have the same cross-sectional area.

9. The pressure control valve (1) of claim 1, wherein at least one pressure pocket (PT, AT, TT) is associated with the pressure port (P), the consumer port (A), and the tank port (T), the at least one pressure pocket (PT, AT, TT) arranged to bring the pressure, consumer and tanks pressure ports (P, A, T) into connection with the at least one working chamber (W, W2) depending on the position of the piston (K), and the pressure pocket (AT) associated with the consumer port (A) is arranged between the pressure pocket (PT) associated with the pressure port (P) and the pressure pocket (TT) associated with the tank port (T).

10. A hydraulic system (HY) comprising the pressure control valve (1) of claim 1, wherein a hydraulic actuator (AK, AK1, AK2, AK3, AK4, AK5) is connected to the consumer port (A) of the pressure control valve (1), and the first limiting pressure at the consumer port (A) of the pressure control valve (1) corresponds to a pre-filling pressure of the actuator (AK).

11. The hydraulic system (HY) of claim 10, further comprising a shut-off valve (VDC) connected to the pump port (P), the shut-off valve (VDC) configured for reducing a return flow of hydraulic fluid from the pump port (P) in the direction of a pressure supply of the hydraulic system (HY).

12. A motor vehicle transmission (G), comprising the hydraulic system (HY) of claim 10, wherein the actuator (AK, AK2, AK3, AK4, AK5) of the hydraulic system (HY) is provided for actuating at least one shift element (DK1, DK2, SE1, SE2, K0) of the motor vehicle transmission (G).

13. The motor vehicle transmission (G) of claim 12, further comprising an input shaft (GW1), an output shaft (GW2), and a gearshift section (GW) for actuating different transmission ratios between the input shaft (GW1) and the output shaft (GW2), wherein the at least one shift element (SE1, SE2) is provided for establishing a force-fit connection in the gearshift section (GW).

14. The motor vehicle transmission (G) of claim 12, wherein the at least one shift element (DK1, DK2) is an integral part of a launch clutch of the motor vehicle transmission (G).

15. The motor vehicle transmission (G) of claim 12, wherein the at least one shift element (DK1, DK2, SE1, SE2, K0) is a multi-disk clutch.

\* \* \* \* \*